(12) United States Patent
Al-Maadid

(10) Patent No.: US 8,477,189 B2
(45) Date of Patent: Jul. 2, 2013

(54) REAL-TIME SOLAR OBSERVATIONS

(75) Inventor: Lolwa Ali Sultan Al-Maadid, Doha (QA)

(73) Assignee: Qatar Foundation, Doha (QA)

( * ) Notice: Subject to any disclaimer, the term of this patent is extended or adjusted under 35 U.S.C. 154(b) by 177 days.

(21) Appl. No.: 13/211,153

(22) Filed: Aug. 16, 2011

(65) Prior Publication Data
US 2013/0044214 A1 Feb. 21, 2013

(51) Int. Cl.
H04N 7/18 (2006.01)
H04N 5/228 (2006.01)
H04N 5/232 (2006.01)

(52) U.S. Cl.
USPC .................. 348/143; 348/208; 348/356

(58) Field of Classification Search
None
See application file for complete search history.

(56) References Cited

U.S. PATENT DOCUMENTS
7,105,791 B1 * 9/2006 Poller .................... 250/203.1

FOREIGN PATENT DOCUMENTS
| | | |
|---|---|---|
| CN | 101493322 A | 7/2009 |
| DE | 102006004498 A1 | 8/2007 |
| DE | 102008010844 A1 | 8/2009 |
| EP | 2154630 A1 | 2/2010 |
| JP | 2004334042 A | 11/2004 |

OTHER PUBLICATIONS

International Search Report in GB1113964.9 dated Dec. 16, 2011.

* cited by examiner

*Primary Examiner* — David Czekaj
*Assistant Examiner* — Nam Pham
(74) *Attorney, Agent, or Firm* — Mossman Kumar & Tyler PC

(57) ABSTRACT

A system for real-time solar observation comprises an optical detector operable to detect sunlight and to produce image data from detected sunlight, a shadow detector operable to produce image data relating to a shadow cast by a reference object, and a controller operable to receive image data from the optical detector and from the shadow detector. The controller is operable to determine at least one of a sunrise period, a midday period and a sunset period in dependence upon received image data.

4 Claims, 17 Drawing Sheets

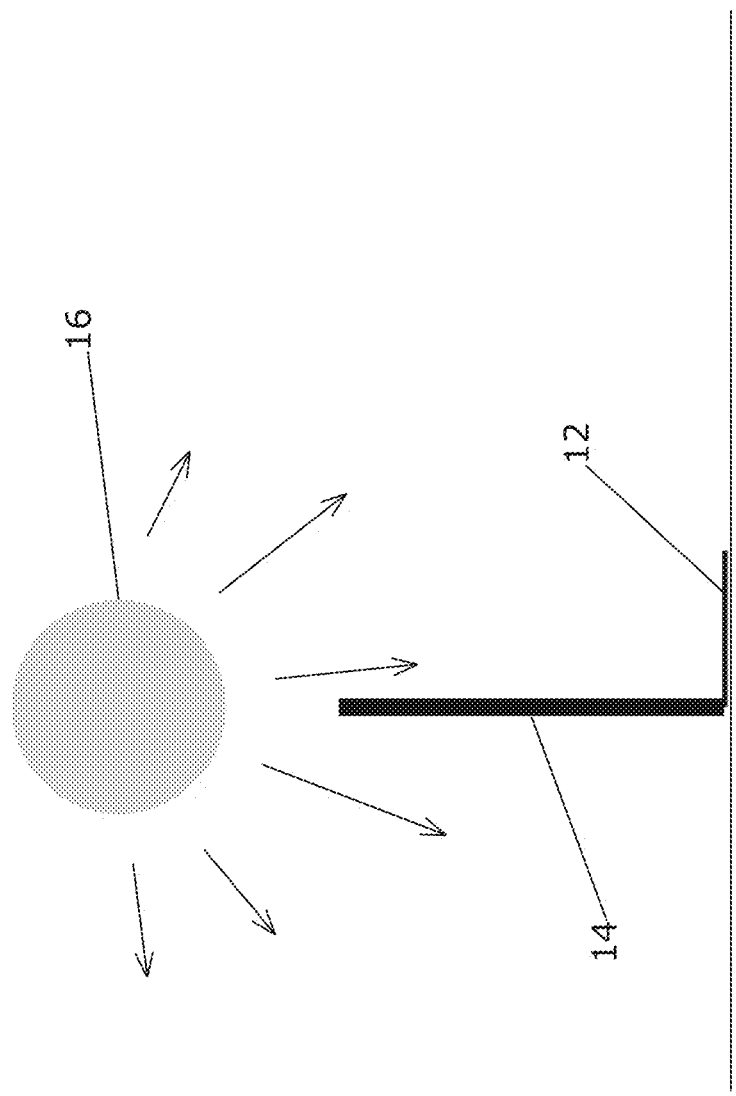

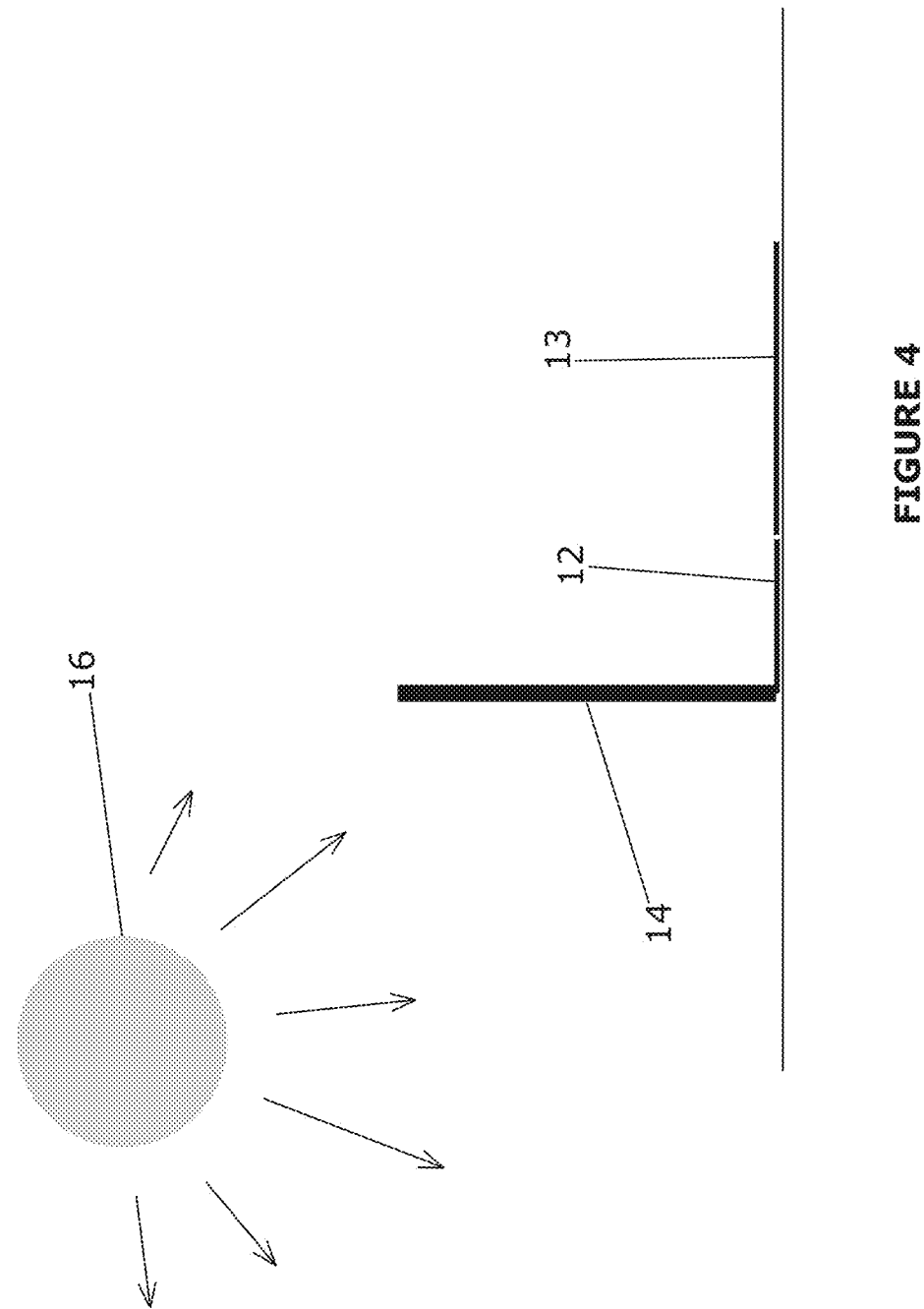

REAL-TIME SOLAR OBSERVATIONS

The present invention relates to real-time solar observation, and, in particular, to systems and methods for detecting sun position in real time.

BACKGROUND

It is often desirable to know the exact position of the sun in the sky. For example, followers of the Islamic religion, and of other religions, have prayer times and fasting times dependent on the position of the sun. It is, therefore, desirable to be able to know the exact timing of particular solar positions. For example, the beginning and ending of sunrise, the beginning and ending of the midday sun, and the beginning and ending of sunset are all important points in the Islamic prayer and fasting day.

Currently, there are many methods, charts and devices available to a user for predicting the timing of the sun's position. For example, using knowledge of the rotation of the earth about its own axis, and its rotation about the sun, it is possible to predict the timing of the important times of the solar day and provide these in chart or other form to a user.

However, since these times are based on prediction, such predictions can have noticeable errors, for example up to thirty minutes of error.

It is therefore desirable to provide a system and method which overcomes the drawbacks of the previously considered solutions.

SUMMARY

According to one aspect of the present invention, there is provided a system for real-time solar observation, the system comprising an optical detector operable to detect sunlight and to produce image data from detected sunlight, a shadow detector operable to produce image data relating to a shadow cast by a reference object, and a controller operable to receive image data from the optical detector and from the shadow detector, wherein the controller is operable to determine at least one of a sunrise period, a midday period and a sunset period in dependence upon received image data.

In one example, the controller is operable to detect a sunrise period by detecting a sunrise period start time at which substantially white light is first visible parallel above a predetermined horizon, and by detecting a sunrise period end time at which a solar disc image is substantially tangential with the predetermined horizon, and wherein the controller is operable to detect a midday period by detecting a midday period start time at which said shadow has a minimum length, and by detecting a midday period end time at which said shadow has a length substantially equal the sum of the minimum length and the length of the reference object, and wherein the controller is operable to detect a sunset period by detecting a sunset start time at which a solar disc image is substantially tangential above the predetermined horizon, and by detecting a sunset end time at which no substantially red light is visible above the predetermined horizon.

In such an example, the optical detector is operable to provide sunrise image data from a substantially East-facing direction, and to provide sunset image data from a substantially West-facing direction.

In such an example, the controller is operable to output an alarm signal upon detection of said start and end times.

According to another aspect of the present invention, there is provided a method for detecting a position of the sun in the sky in real time, the method comprising receiving image data from an optical detector operable to produce image data from detected sunlight, and from a shadow detector operable to produce image data relating to a shadow cast by a reference object, and detecting at least one of a sunrise period, a midday period and a sunset period in dependence upon the received image data.

In one example of such a method detecting a sunrise period comprises detecting a sunrise period start time at which substantially white light is first visible parallel above a predetermined horizon, and detecting a sunrise period end time at which a solar disc image is substantially tangential with the predetermined horizon, and detecting a midday period comprises detecting a midday period start time at which said shadow has a minimum length, and detecting a midday period end time at which said shadow is substantially equal in length to the sum of the minimum length and the length of the reference object, and detecting a sunset period comprises detecting a sunset start time at which a solar disc image is substantially tangential with the predetermined horizon, and detecting a sunset end time at which no substantially red light is visible above the predetermined horizon.

Such a method may further comprise generating an alarm signal upon detection of said start and end times.

BRIEF DESCRIPTION OF THE DRAWINGS

FIG. 3 is an image illustrating the start of the midday period;
FIG. 4 is an image illustrating the end of the midday period.

DETAILED DESCRIPTION

Figure 1A:
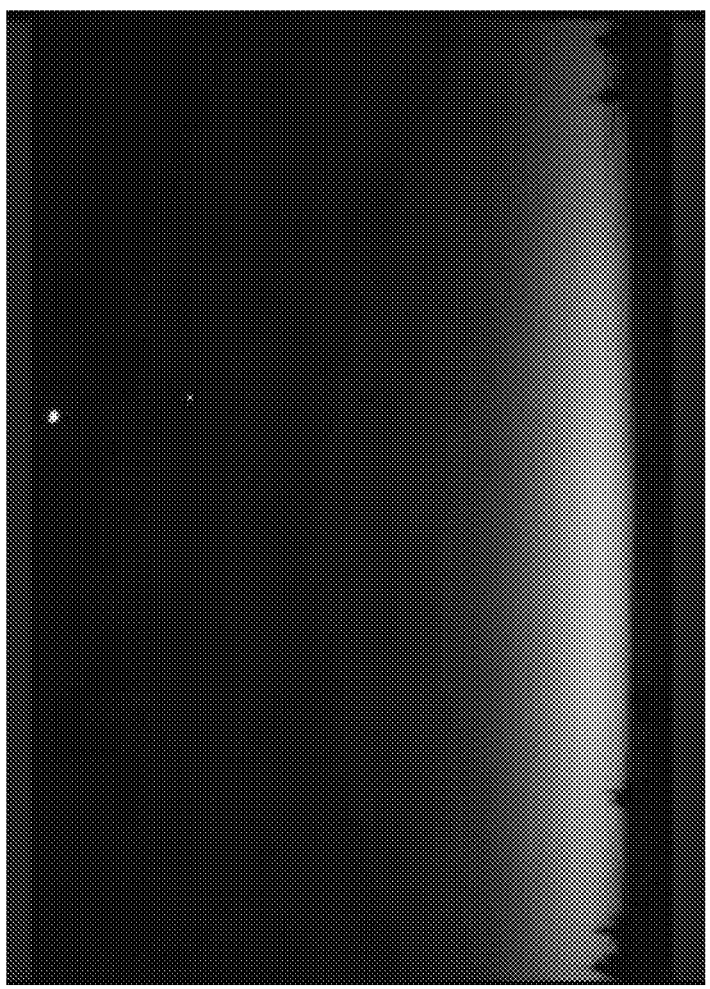
FIGS. 1A, 1B and 1C are images illustrating the start of the sunrise period.
Figure 1B:
Figure 1C:
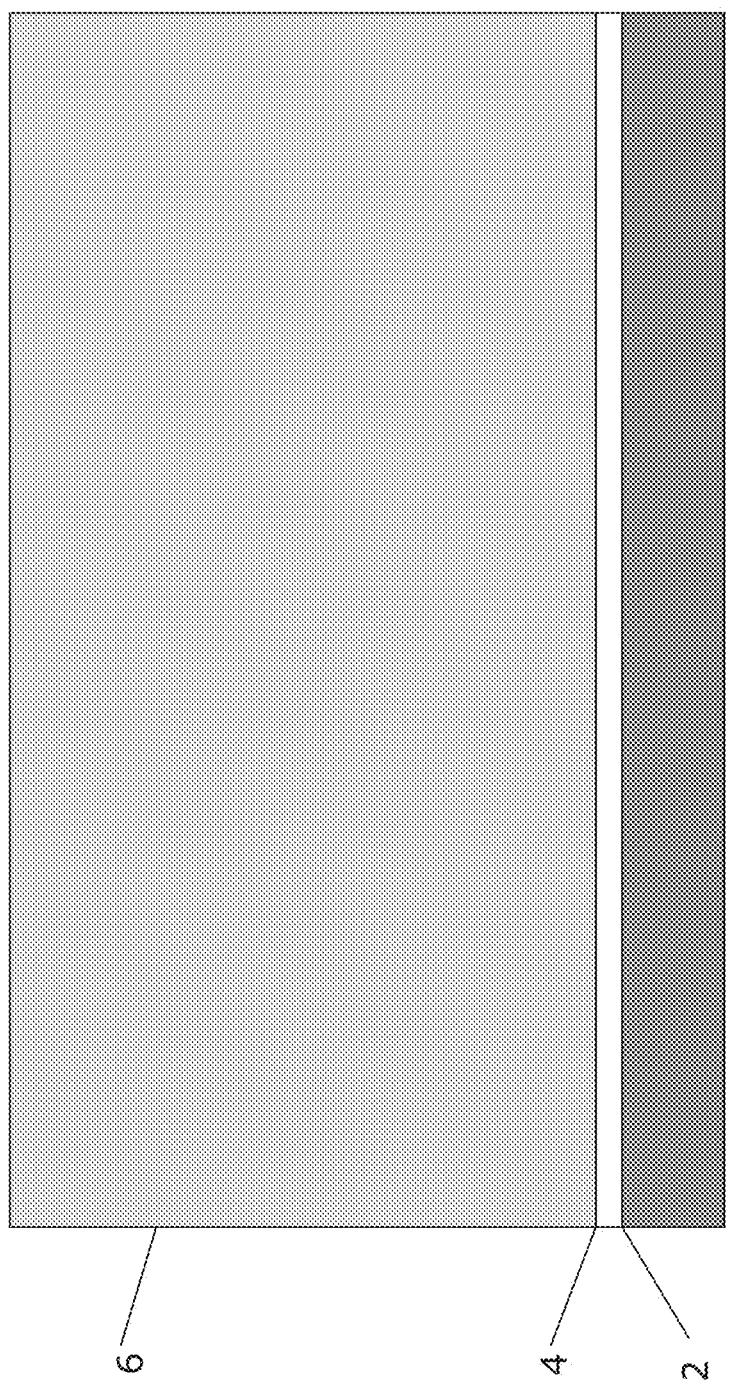

FIGS. 1A, 1B and 1C illustrate the start of the sunrise period; FIGS. 1A and 1B are photographs of the sun rising above the eastern horizon, and FIG. 1C is a schematic version thereof. The start of the sunrise period is defined by the time when a band of white light is visible above the eastern horizon. As will be seen in FIG. 1C, horizon 2 is illustrated, with a band of white light 4 appearing in the sky 6 just above the horizon 2.

Figure 1D:
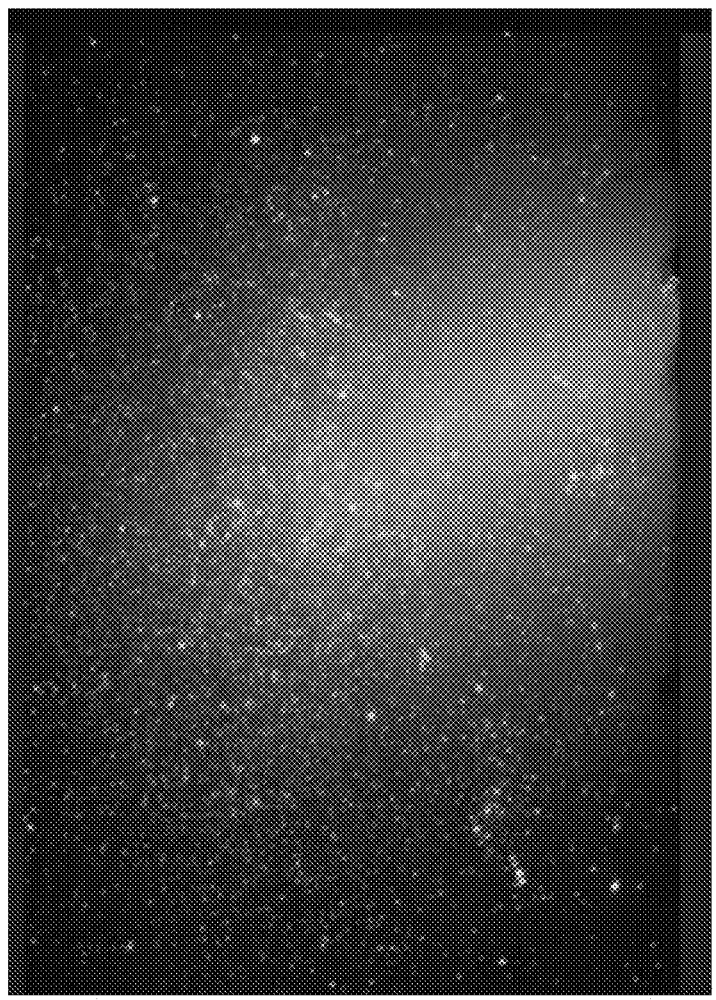
FIG. 1D is an image illustrating a false sunrise.
Figure 2A:
FIGS. 2A and 2B are images illustrating the end of the sunrise period.
Figure 2B:
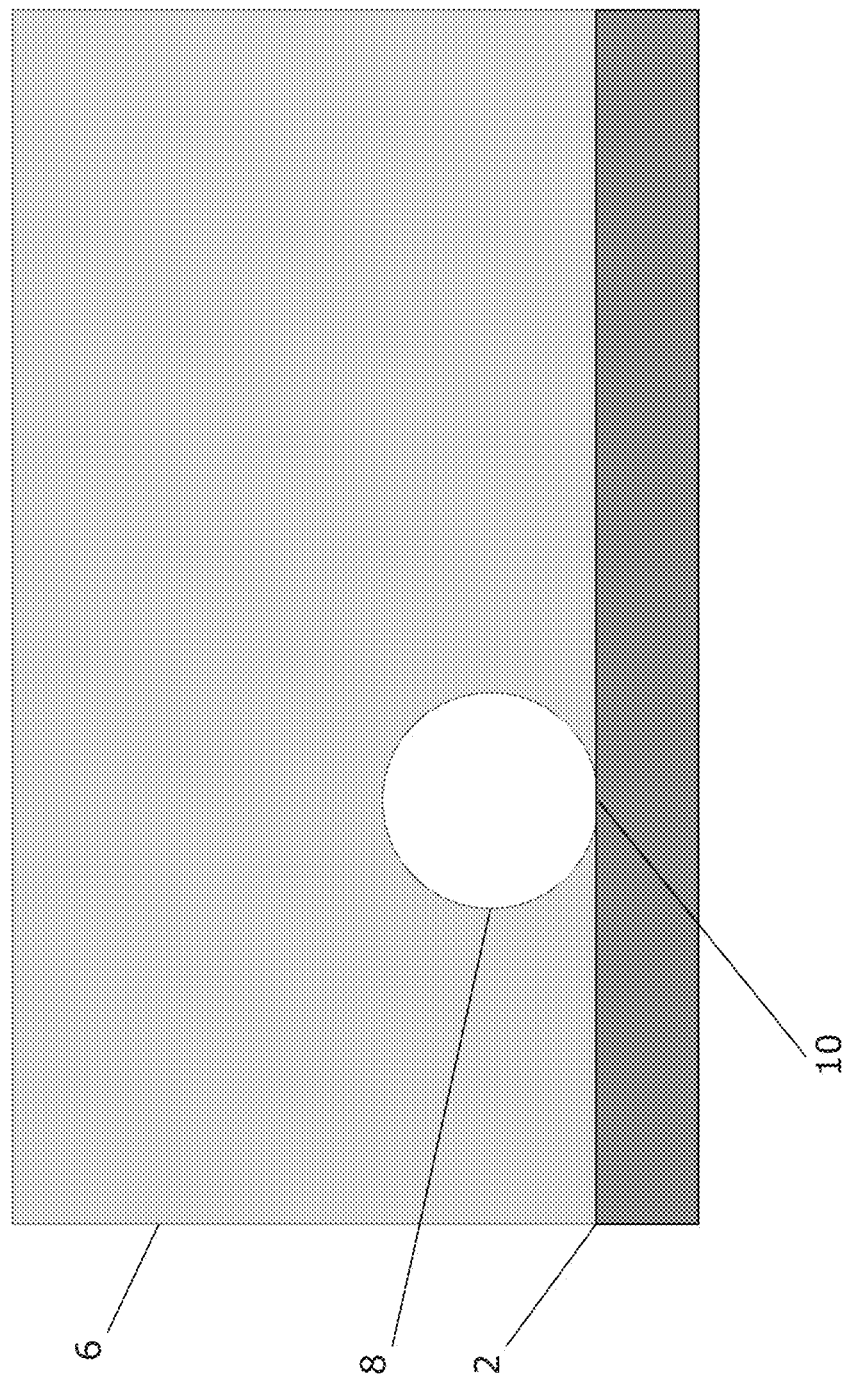

FIG. 1D illustrates an image of a possible false sunrise, in which dust particles in the atmosphere reflect light from a pre-sunrise sun into the field of view of the observer In FIGS. 2A and 2B, the end of the sunrise period is shown. As in FIG. 1A, FIG. 2A shows a photograph and FIG. 2B is a schematic illustration. The end of the sunrise period is defined as the point at which the solar disc 8 is completely visible above the eastern horizon 2 in the sky 6. The extent of the solar disc 8 does not extend below the eastern horizon; the solar disc 8 is effectively tangential at a point 10 with the horizon 2.

FIG. 3 illustrates the start of the midday period, when a shadow 12 cast by a reference object 14 is at a minimum length. At the equator, the midday shadow for a vertical reference object will be effectively of zero length. At locations away from the equator, the midday shadow of a vertical reference object will be of a minimum length. The end of the midday period is shown in FIG. 4, and is defined as the time at which the shadow 13 cast by the object 14 is equal to the sum of the length of the reference object 14 and the length of the minimum shadow 12.

Figure 5A:
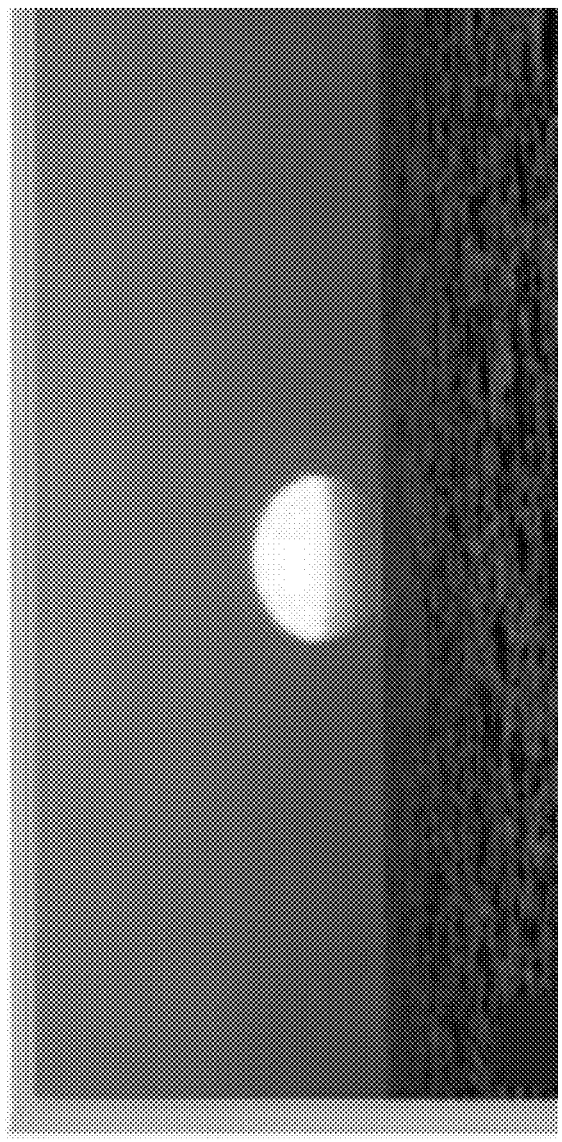
FIGS. 5A and 5B are images illustrating the start of the sunset period.
Figure 5B:
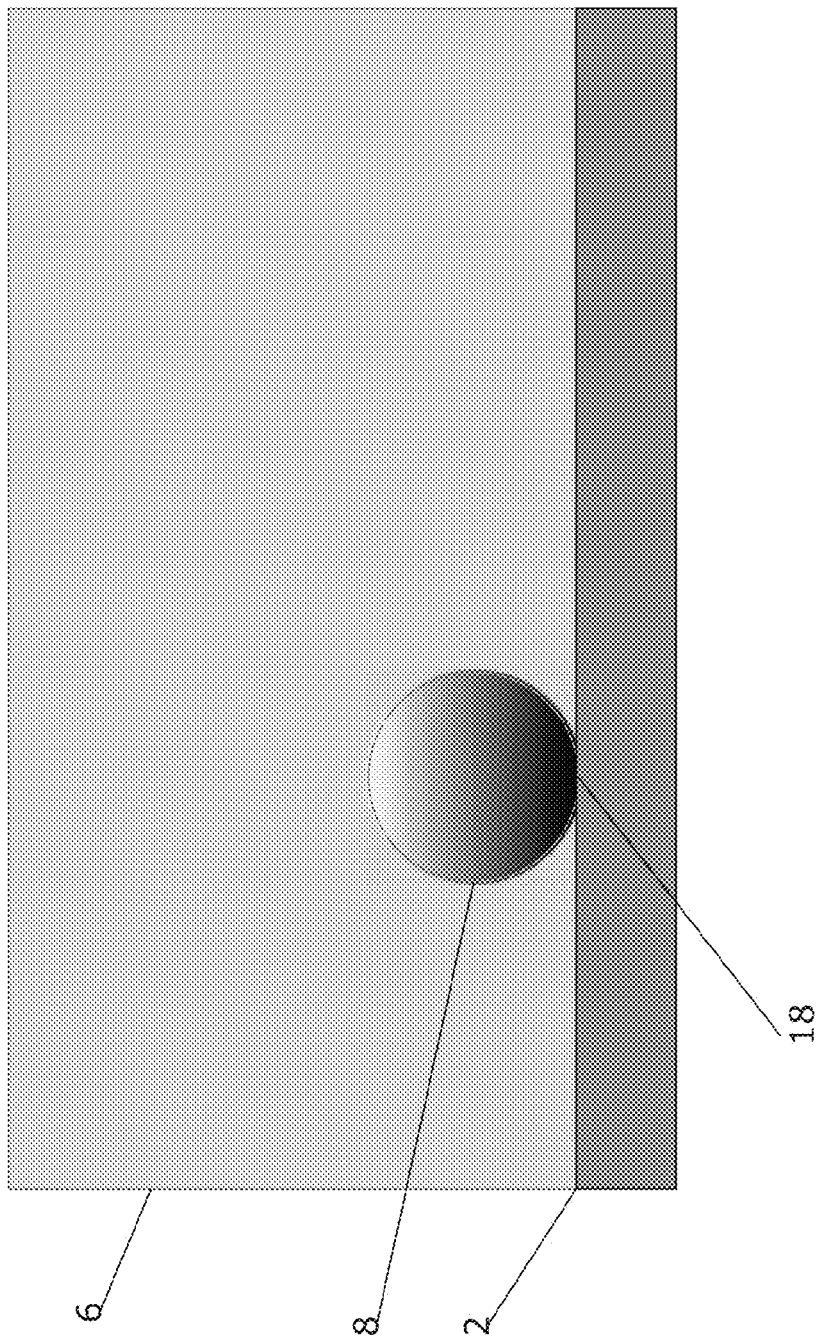

FIG. 5 illustrates the commencement of the sunset period, with FIG. 5A being a photograph of such a sunset, and FIG. 5B showing it in schematic form. The start of the sunset period is defined as the point at which the solar disc 8 is tangential with the western horizon 2, such that the solar disc 8 does not extend past the western horizon 2. The solar disc 8 is effectively tangential at a point 18 with the horizon 2.

Figure 6A:
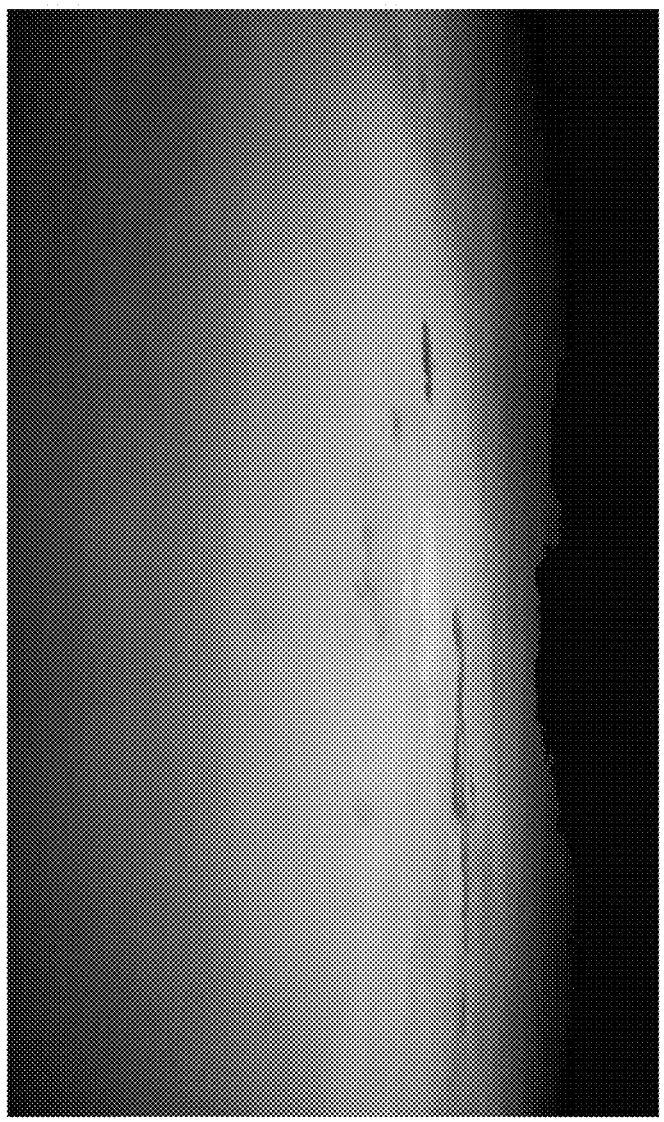
FIGS. 6A and 6B are images illustrating the end of the sunset period.
Figure 6B:
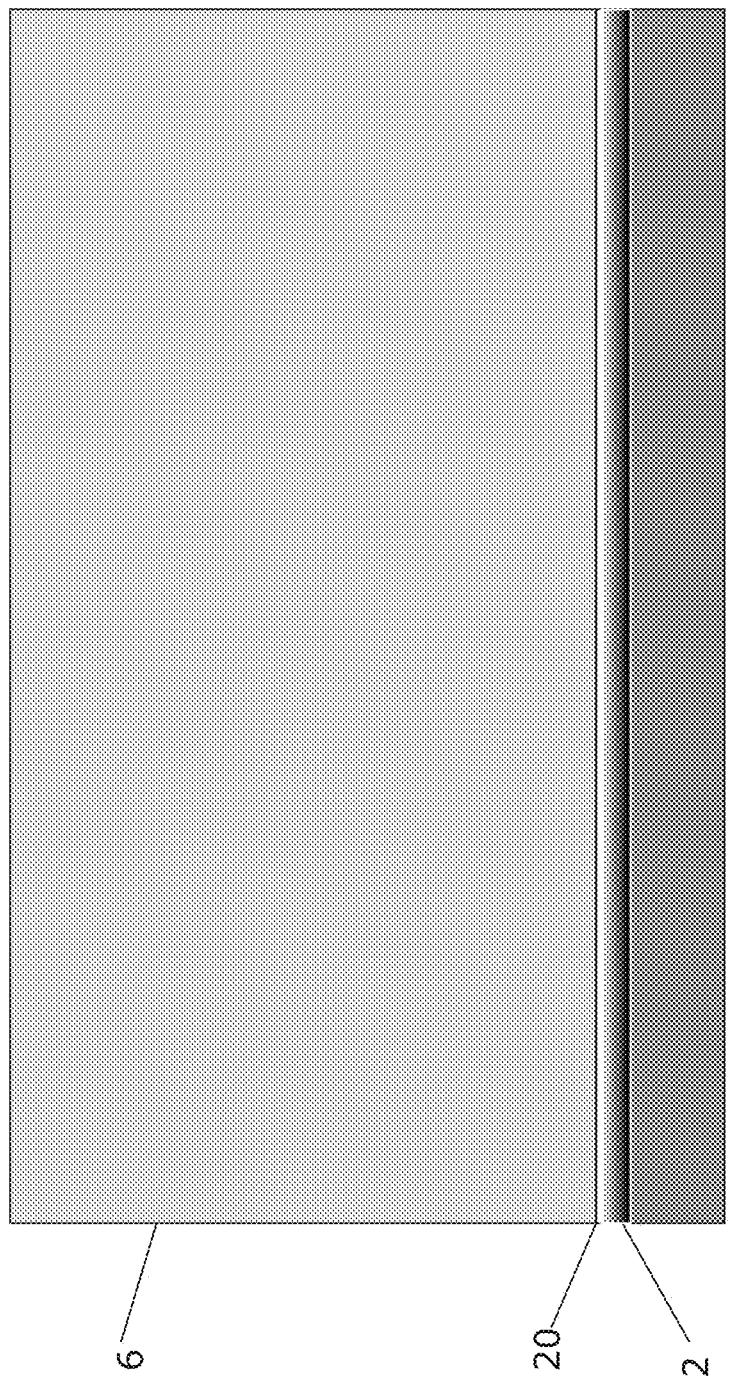

FIG. 6A is a photograph showing the end of the sunset period, and FIG. 6B illustrates this schematically. The end of the sunset period is defined as the moment at which the band of red light 20 disappears from above the western horizon 2 in the sky 6, so that no part of the solar disc 8 is visible.

Figure 7:
FIG. 7 is an image illustrating a cloudy day.

FIG. 7 illustrates a situation in which the solar disc is not visible, for example, through cloud, when an alternative technique must be used.

Figure 8:
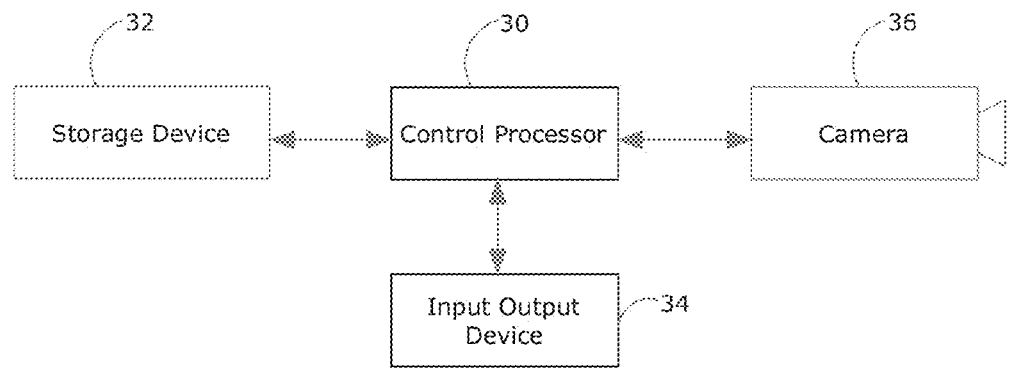
FIG. 8 is a schematic block diagram of a system embodying an aspect of the present invention.
Figure 9:
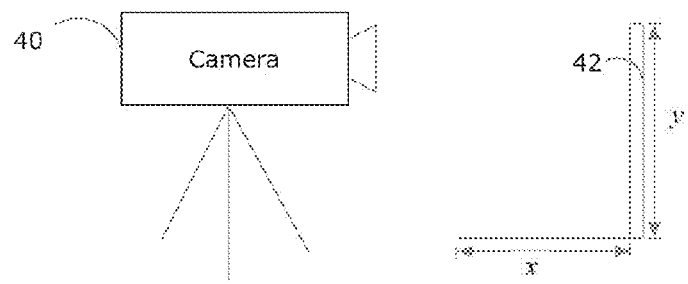
FIG. 9 is a schematic block diagram of part of a system embodying an aspect of the present invention.

FIG. 8 is a schematic block diagram illustrating a system embodying one aspect of the present invention. The system comprises a control processor 30, for example provided by a personal computer. The system also comprises a data storage device 32 for storing reference data and observation data, and comprises an input/output device 34 for interaction with a user. The system also comprises at least one camera 36, or other suitable optical sensor device, for receiving observed light 38 and for providing observation data to the control processor 30. FIG. 9 illustrates a second camera 40 provided in the system, which camera is used to observe a shadow x cast by a reference object 42 of length y.

The present invention provides solar observations in the early morning from the east, at midday, and in the evening from the west, and these observations may be provided by three separate cameras provided for those specific purposes. Alternatively, a single camera could be provided for the sunset and sunrise observations, the camera being moved, manually or using motorised mounting, between an east facing position and a west facing position. Furthermore, the same camera could be used to detect the shadow length of the reference object during the midday period.

Figure 10:
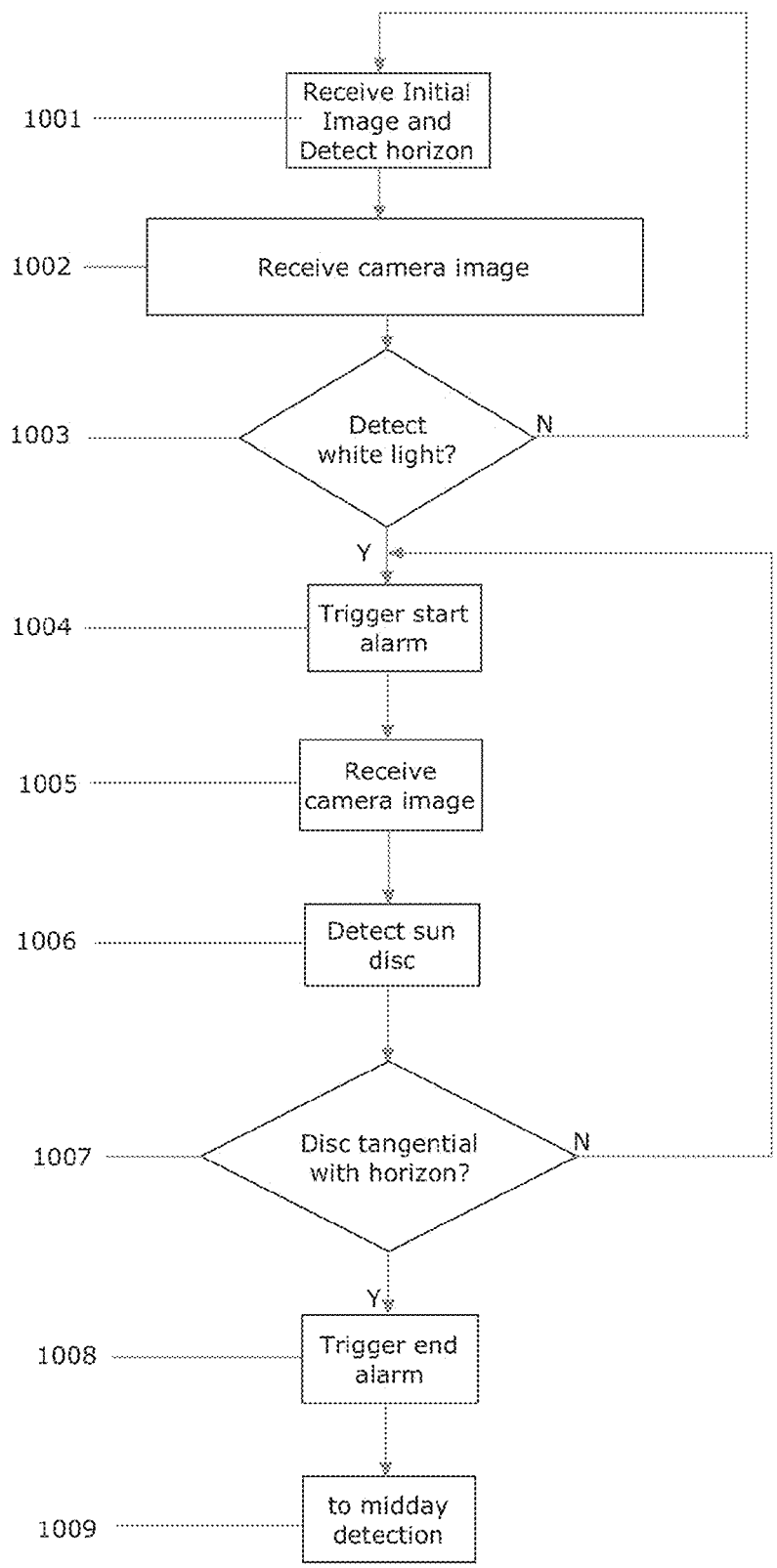
FIGS. 10 to 12 are flowcharts showing steps in a process embodying another aspect of the present invention.

FIG. 10 is a flow chart illustrating steps in detecting the sunrise period using a system as shown in FIGS. 8 and 9, described with reference to FIGS. 1 and 2. Referring to FIG. 10, at step 1001, the control processor 30 is operable to receive camera image data and to locate the horizon using that data. At step 1002, the camera 36 receives light from the sky 38, and passes camera image data to the control processor 30. The control processor 30 is operable to process the image data to detect the presence of white light substantially parallel to and above the horizon (step 1003). If white light is not detected, further camera image data are received (step 1002). If, however, white light substantially parallel to the horizon is detected (step 1004), the control processor 30 generates a start of sunrise signal which is sent to the input/output device 34 (step 1005). The control processor uses the detection of light substantially parallel to the horizon in order to ensure that the detected light is differentiated from light due to dust reflecting light in the sky before sunrise starts, or any other stray light. The input/output device 34 generates a suitable alarm signal to alert the user.

The system then starts to detect for the presence of the end of the sunrise period. Camera image data are received (step 1005), and the control processor 30 operates to process the image data and to detect the position of the solar disc (step 1006). This detection can be achieved using filtering and appropriate image processing techniques. The processor 30 then operates to determine whether the solar disc 8 is substantially tangential to and above the horizon 2 (step 1007), and, if not, the processor 30 reverts to a receiving new camera image data (step 1005).

If the solar disc 8 is detected to be substantially tangential with and above the Eastern horizon 2, then an end of sunrise signal is sent to the input/output device 34 (step 1008). The input/output device 34 generates a suitable signal to alert the user. The system moves onto midday period detection (step 1009).

Figure 11:
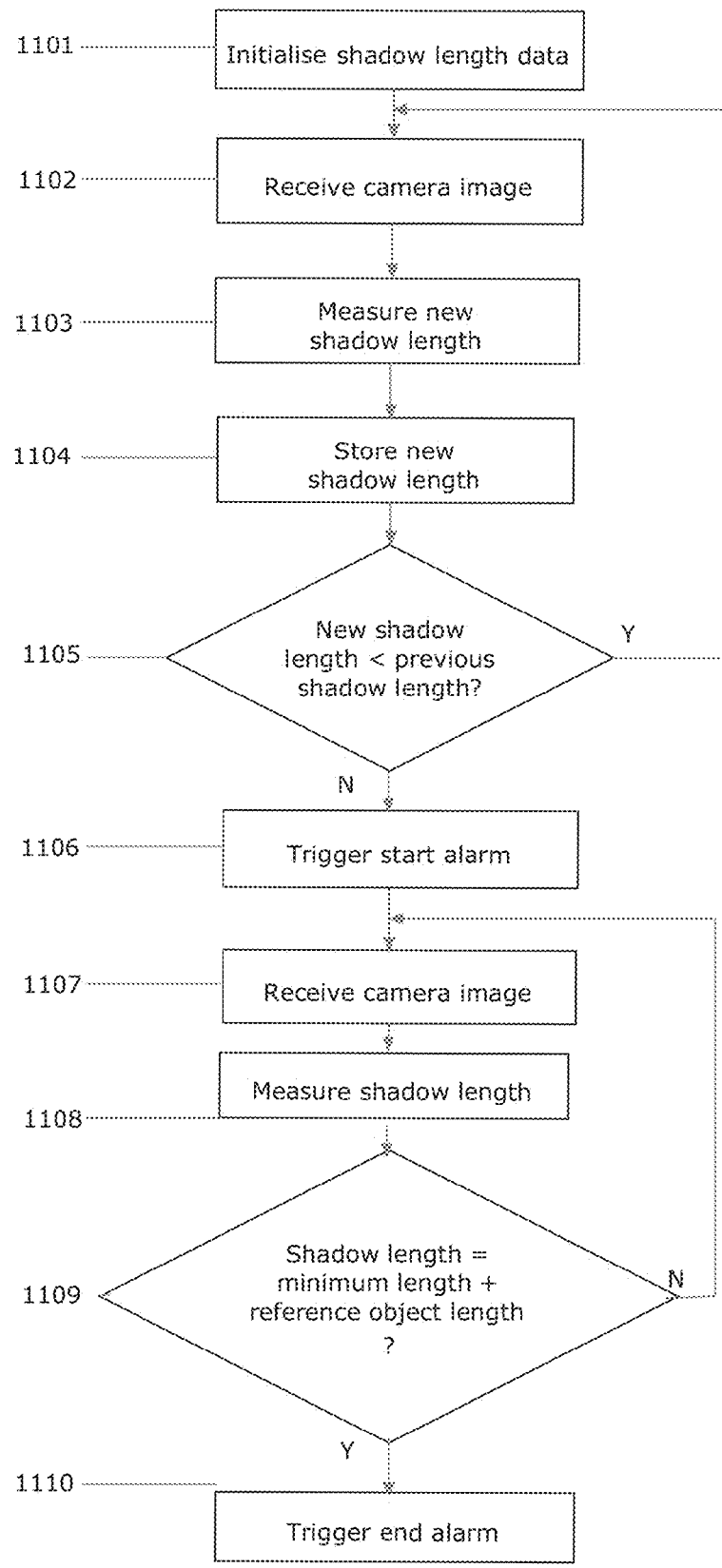

FIG. 11 illustrates a method for detecting the start and end of the midday period, and starts with step 1101 in which shadow length information is initialised. For example, the initial shadow length can be set to be an arbitrary length known to be longer than the longest possible detected shadow length. At step 1102, camera image are received by the control processor 30, which operates to measure a new shadow length $x_n$ from the camera image data (step 1103). This new shadow length $x_n$ is stored in the storage device 32 (step 1104), and is then compared with the previous shadow length $x_{n-1}$ (step 1106). If the new shadow length is less than the previous shadow length $x_{n-1}$, then the sun is still rising (it is not yet midday), and so the system reverts to receiving further camera image data (step 1102).

If, however, the new shadow length is greater than or equal to the previous shadow length $x_{n-1}$, then the midday point has been reached, and the system generates a start of the midday period signal (step 1107). The signal is passed to the input/output device 34 which outputs a suitable alarm to the user. The shadow length is then stored as a reference minimum shadow length $x_{min}$.

The system then proceeds to detect the end of the midday period by receiving camera image data (step 1107), and measuring the shadow length $x_m$ from the received camera image data (step 1108). If the measured shadow length $x_m$ is substantially equal to the sum of the reference minimum shadow length $x_{min}$ and the length of the reference object 14, then an end of the midday period signal is generated (step 1109) and sent to the input/output device 34 for alerting the user (step 1110). If the measured shadow length is less than the reference length, however, further camera image data are received (step 1107) until the end of the midday period is detected. The method then proceeds to detection of the sunset period.

Figure 12:
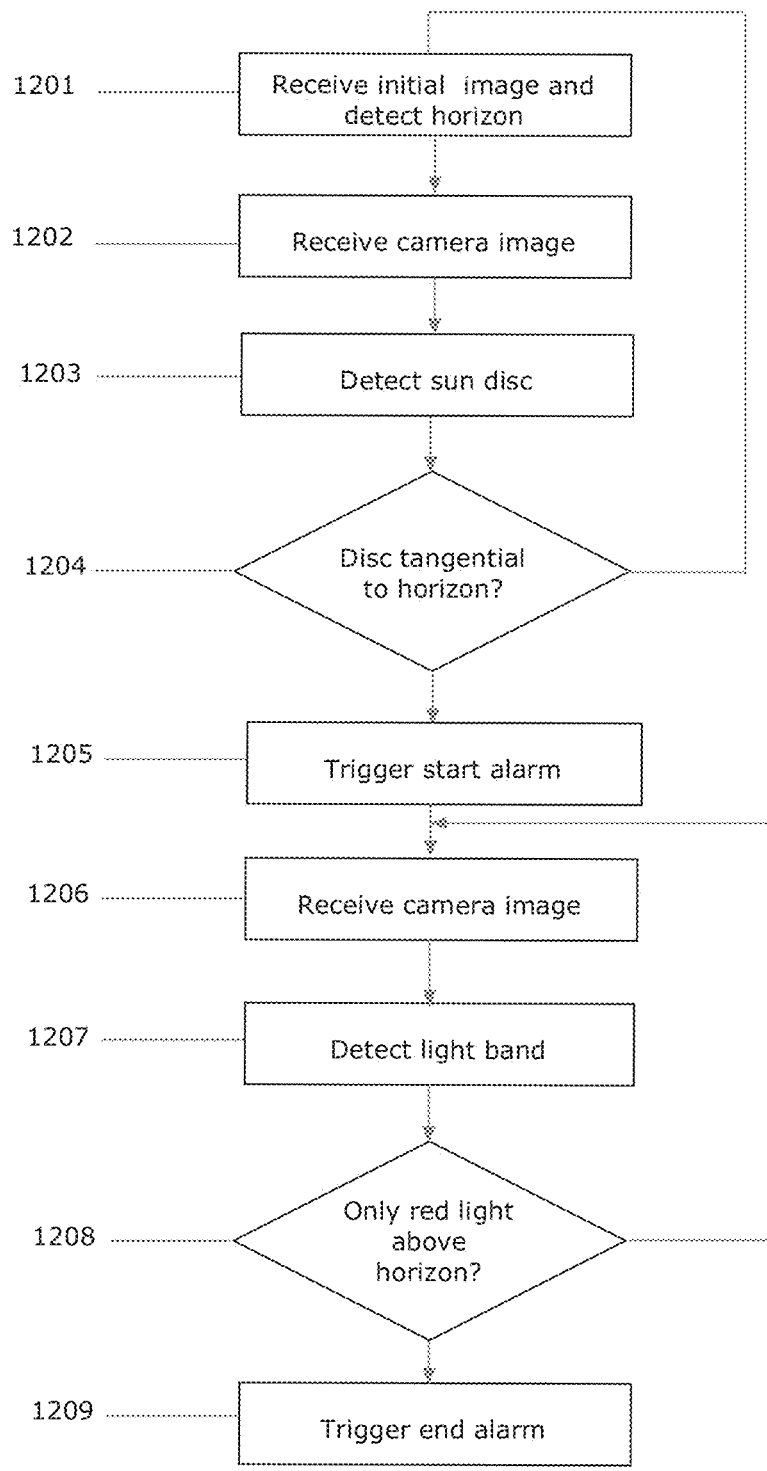

In FIG. 12, the sunset period detection method is illustrated. At step 1201, the west facing camera produces initial image data which are received by the control processor 30. The control processor 30 operates to detect the horizon 2 from the initial image data. Further camera image data are received (step 1202), and the control processor 30 then detects the location of the solar disc (step 1203). The processor 30 determines whether the solar disc is tangential to the horizon 2 (step 1204). If this is not the case, further camera image data are received and processed (steps 1202 and 1203).

If the solar disc 8 is determined to be tangential to the western horizon 2, then a start of the sunset period signal is generated and sent to the input/output device 34. An alarm to the user is the output (step 1205). The method then proceeds to the detection of the end of the sunset period, by reception of further camera image data (step 1206).

The control processor 30 processes the image data and detects any light band visible above the horizon 2 (step 1207).

This visible light band turns to red light as the sun sets, and the control processor 30 determines the moment such red light disappears from view. This point in time is defined as the end of sunset and typically occurs when the sun is about 12 degrees below the horizon, dependent upon location and time (step 1208). At this point an end of sunset period signal is generated and supplied to the input/output device 34. The user is then notified of the end of the sunset period (step 1209).

In this manner, the important times of day associated with the sun's position can be determined and can be transmitted as alarm signal to users.

In the situation in which the sun is not clearly visible, for example when the sky is cloudy as shown in the photograph of FIG. 7, then the control processor 30 accesses predictive data stored in the data storage device 32. The control processor issues start and end signals on the basis of the stored predictive data when the camera image data are not available. The processor 30 is operable to compare and update the stored predictive data on the basis of the processed observation data.

In one possible example deployment of a number of systems embodying the present invention, a system that has a clear view of the sun in the sky can transmit its observation data to other systems in a network of systems, so as to improve the prediction data held by those other systems. In such a way, the network as a whole can benefit from real-time solar position sensing leading to improved timing prediction. Such transmission may be over a local area network, a wide area network or over the Internet, using wired and or wireless transmission media.

The start and end signals that are provided to users may be in the form of an audible and/or visible alarm that is provided to the direct user of the system. Alternatively, the signal may be transmitted to a remote user, for example using a cellular mobile telephone or other suitable transmission technology. The start and end signals may also be used to trigger a prerecorded prayer call or other appropriate broadcast alert signal.

The control processor 30 is operable to process received camera image data in order to determine the presence of particular light signatures indicative of the points in time that are being detected. In the case of detection of the commencement of sunrise, the east facing camera data are processed in order to detect the first presence of white light above the horizon and parallel to it (when the top of the sun ball appear). This detection can be achieved by appropriate processing and filtering of the image data in order to increase the contrast of the image, and to detect the appropriate intensity and wavelengths of light. The position the horizon can be located either by positioning the camera such that a reference line is located on the horizon, or by appropriate processing of the camera image.

One technique for detecting the solar disc is to increase the contrast of the camera image, so as to remove any edge effects from the image of the sun. The edge of the solar disc is then detected by detecting a sharp change in brightness at the disc edge. The relative position of the edge of the disc with respect to the horizon can then be assessed. The horizon can be located or detected as before.

Detection of the moment when the red light that occurs at the end of the sunset period (the moment when the sun disappear) may be achieved by filtering extra received light to show the red component. If all or a significant portion of the light is filtered out, then the end of the sunset period (beginning of night) has been detected.

Measurement of the midday period shadow cast by the reference object is achieved using a high contrast image, and known geometry processing. The relative positions of the camera and the reference object are known, as is the angle at which the camera observes the shadow. Using this information, it is possible to measure the length of the cast shadow. Detection of the midday shadow, that is the shadow having the minimum length, is achieved by determining the first point at which the shadow stops shortening. Detecting the end of the midday period simply requires comparison of the (measured shadow length plus the minimum shadow) with the known length of the reference object.

It will be readily appreciated that the present invention has been described with reference to specific examples, and that the inventive concepts could be applied in different implementations without diverging from those inventive concepts.

What is claimed is:

1. A system for real-time solar observation, the system comprising:
   an optical detector operable to detect sunlight and to produce image data from detected sunlight, wherein the optical detector is operable to provide sunrise image data from a substantially East-facing direction, and to provide sunset image data from a substantially West-facing direction;
   a shadow detector operable to produce image data relating to a shadow cast by a reference object; and
   a controller operable to receive image data from the optical detector and from the shadow detector, wherein the controller is operable to:
   determine at least one of a sunrise period, a midday period and a sunset period in dependence upon the received image data,
   detect the sunrise period by detecting a sunrise period start time at which substantially white light is first visible parallel above a predetermined horizon, and by detecting a sunrise period end time at which a solar disc image is substantially tangential with the predetermined horizon,
   detect the midday period by detecting a midday period start time at which said shadow has a minimum length, and by detecting a midday period end time at which said shadow has a length substantially equal the sum of the minimum length and the length of the reference obiect, and
   detect the sunset period by detecting a sunset start time at which a solar disc image is substantially tangential above the predetermined horizon, and by detecting a sunset end time at which no substantially red light is visible above the predetermined horizon.

2. A system as claimed in claim 1, wherein the controller is operable to output an alarm signal upon detection of said start and end times.

3. A method for detecting a position of the sun in the sky in real time, the method comprising:
   receiving image data from an optical detector operable to produce image data from detected sunlight, and from a shadow detector operable to produce image data relating to a shadow cast by a reference object; and
   detecting at least one of a sunrise period, a midday period and a sunset period in dependence upon the received image data,
   wherein detecting the sunrise period comprises: detecting a sunrise period start time at which substantially white light is first visible parallel above a predetermined horizon, and detecting a sunrise period end time at which a solar disc image is substantially tangential with the predetermined horizon,
   wherein detecting the midday period comprises: detecting a midday period start time at which said shadow has a minimum length, and detecting a midday period end time at which said shadow is substantially equal in length to the sum of the minimum length and the length of the reference object, and wherein detecting the sunset period comprises: detecting a sunset start time at which a solar disc image is substantially tangential with the predetermined horizon, and detecting a sunset end time at which no substantially red light is visible above the predetermined horizon.

4. A method as claimed in claim 3, further comprising generating an alarm signal upon detection of said start and end times.

\* \* \* \* \*